United States Patent [19]

Paulsen et al.

[11] Patent Number: 4,821,927

[45] Date of Patent: Apr. 18, 1989

[54] LIQUID DISPENSING GUN

[75] Inventors: Gary Paulsen, Geneva; Lawrence E. Thomas, Carol Stream; Stephen C. Reif, Naperville; Wade R. Brown, St. Charles, all of Ill.

[73] Assignee: Spraying Systems Co., Wheaton, Ill.

[21] Appl. No.: 26,005

[22] Filed: Mar. 16, 1987

Related U.S. Application Data

[63] Continuation-in-part of Ser. No. 594,654, Apr. 4, 1984, Pat. No. 4,650,099.

[51] Int. Cl.⁴ ............................................. G01F 11/06
[52] U.S. Cl. .................... 222/263; 222/340; 222/441; 222/449; 222/451
[58] Field of Search .............. 222/253, 263, 335, 340, 222/441, 444, 453, 449, 451; 137/627.5

[56] References Cited

U.S. PATENT DOCUMENTS

| | | | |
|---|---|---|---|
| 208,645 | 10/1878 | Spencer | 222/444 |
| 1,538,214 | 5/1925 | Rath | 222/453 X |
| 1,764,823 | 6/1930 | Bowlus | 222/335 |
| 1,979,428 | 11/1934 | Wheeler | 222/335 X |
| 2,106,649 | 1/1938 | Officer, Jr. | 222/449 X |
| 2,366,343 | 1/1945 | Ludwig | 222/449 X |
| 2,605,021 | 7/1952 | Churchill et al. | 222/340 X |
| 2,675,946 | 4/1954 | Strempel | 222/263 X |
| 2,814,422 | 11/1957 | Mercier | 222/335 |
| 3,095,125 | 6/1963 | Bundy | 222/335 X |
| 3,162,336 | 12/1964 | Erickson | 222/335 X |
| 3,369,706 | 2/1968 | Schnyder | 222/335 X |
| 3,790,037 | 2/1974 | Fletcher et al. | 222/444 X |
| 4,006,847 | 2/1977 | Dooley | 222/263 |
| 4,071,046 | 1/1978 | Cates | 137/627.5 X |

FOREIGN PATENT DOCUMENTS

| | | | |
|---|---|---|---|
| 2149544 | 4/1973 | Fed. Rep. of Germany | 222/335 |
| 15701 | of 1910 | United Kingdom | 222/444 |

Primary Examiner—Kevin P. Shaver
Assistant Examiner—David H. Bollinger
Attorney, Agent, or Firm—Leydig, Voit & Mayer

[57] ABSTRACT

A gun is provided for repeatedly dispensing precisely metered quantities of liquid from a pressurized source. The gun includes a valve spool axially slidable within a valve chamber and having at least first and second blocking members for blocking the inlet and outlet ports of the valve chamber. An actuating member associated with the gun is responsive to a unidirectional force to impart relative axial sliding movement of the blocking members in the valve chamber. The relative axial sliding movement of the blocking members sequences the valve spool through a series of positions including the following: (1) a first position that blocks the outlet port of the valve chamber, while permitting the flow of pressurized liquid into a metering chamber of the gun, (2) a second position for stopping the flow of pressurized liquid by simultaneously blocking both the input and output ports of the valve chamber, and (3) a third position that blocks the inlet port of the valve chamber, while permitting communication between the liquid contained in the metering chamber and a discharge nozzle of the gun.

5 Claims, 4 Drawing Sheets

LIQUID DISPENSING GUN

This a continuation-in-part application of copending U.S. patent application Ser. No. 596,654, filed Apr. 4, 1984, now U.S. Pat. No. 4,650,099.

BACKGROUND OF THE INVENTION

The present invention relates to the field of devices for dispensing a predetermined quantity of liquid from a pressurized source in response to each actuation of the device. It finds particular, but not exclusive, utility for dispensing viscous liquids such as ketchup. The device lends itself to advantageous use in fast food operations where careful quantity control of the dispensed liquid is important to the quality of the product and the economics of the operation.

A wide variety of devices for dispensing measured quantities of liquid have been devised heretofore. Such prior devices have numerous shortcomings, including complexity, expense, difficulty in dismantling for cleaning purposes, imprecise measuring of liquid dispensed, or difficulty in handling liquid from a pressurized source.

SUMMARY OF THE INVENTION

One object of the present invention is to provide a gun for repeatedly and reliably dispensing precisely metered quantities of liquid from a pressurized source in a high production operation.

Another object of the invention is to provide a dispensing gun of the type set forth above adapted to be manually actuated with precision by application of fingertip forces. A related object is to provide a dispensing gun of the foregoing nature which is adapted to be operated under power as well as manual means.

A further object is to provide a dispensing gun of the above type which is of simple, compact construction and capable of quick disassembly for cleaning and quick reassembly after cleaning.

Another object of the invention is to provide a dispensing gun of the above character capable of handling pressurized liquid without leakage.

The foregoing objectives are accomplished by the present invention through a remarkably simple and efficient dispensing gun adapted to operate from a pressurized source of viscous liquid. The gun comprises a hollow body having a valve chamber with inlet and outlet ports and a metering chamber connected to the valve chamber by a passageway; an axially slidable valve spool in the valve chamber including at least first and second means for blocking liquid flow and responsive to a substantially unidirectional actuating force that imparts relative motion to the first and second blocking means; a metering piston in the metering chamber resiliently biased toward the passageway; and a trigger-operated assembly for generating the aforementioned actuating force and adapted to sequentially shift the valve spool between a (1) first position for loading the metering chamber with pressurized liquid and overcoming the metering piston biasing means while the outlet port is blocked, (2) a second position for isolating a quantity of the pressurized liquid in the valve metering chambers by blocking both the input and output ports, and (3) a third position for opening the outlet port while maintaining the input port closed so as to discharge through the outlet port a metered quantity of liquid from the metering chamber.

While the invention is susceptible of various modifications and alternative constructions, two alternative illustrative embodiments have been shown in the drawings and will be described below in considerable detail. It should be understood, however, that there is no intention to limit the invention to the specific forms disclosed, but, on the contrary, the intention is to cover all modifications, other alternative constructions, and equivalents falling within the scope of the appended claims.

DETAILED DESCRIPTION OF THE INVENTION

Referring more specifically to the first embodiment of the invention illustrated in FIGS. 1-4, the present invention is there exemplified in a dispensing gun 10 adapted when actuated by manual or power means to dispense precisely metered quantities of liquid. The gun 10 comprises a hollow body 11 connected to a pressurized supply line 12 which in this instance contains ketchup. The supply line 12 passes through a handle 14 attached to the body and terminates in a supply line fitting 15 threadedly connected to the body. An actuating trigger 16 is pivotally attached to a support bracket 18 fixed to one end of the body. Fluid is discharged from an outlet nozzle 19 threadedly attached to the body by nozzle fitting 20. Each time the trigger 16 is squeezed toward the handle 14, a precisely metered quantity of ketchup is discharged from the gun 10. Upon release of the trigger, the gun promptly reloads for the next discharge.

Figures 1, 2, 4:
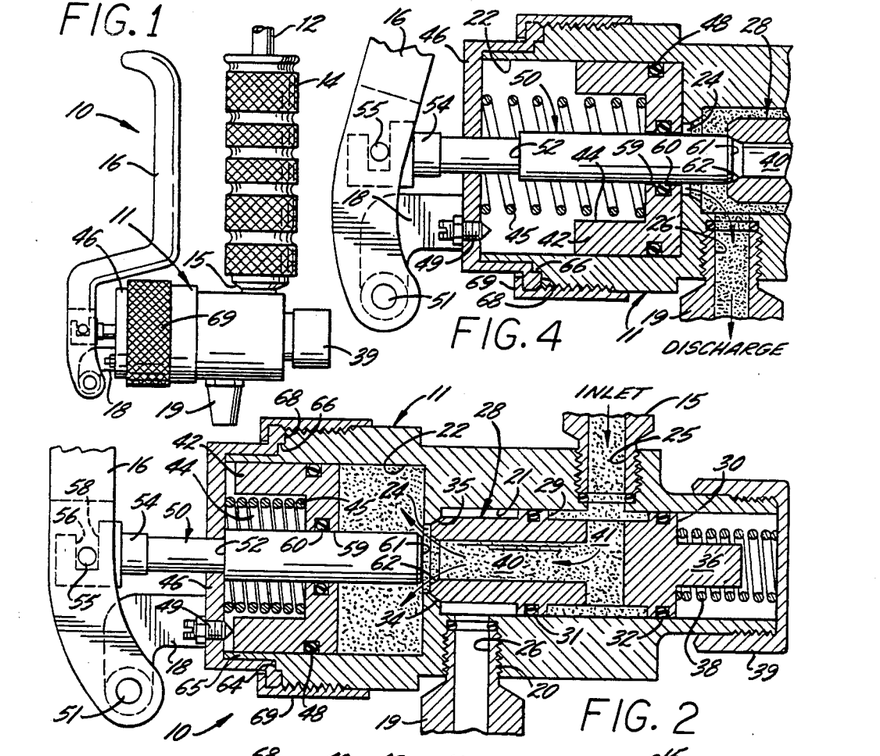
FIG. 1 is a side elevational view of an illustrative liquid dispensing gun exemplifying a first embodiment of the present invention.
FIG. 2 is an enlarged fragmentary sectional view taken axially through the body of the dispensing gun shown in FIG. 1 with the parts in the intake position.
FIG. 4 is an enlarged fragmentary sectional view similar to FIG. 2 but with the metering cylinder in the fully discharged condition.

In order to provide for the intake and discharge of liquid to and from the dispensing gun 10, the body 11 is formed with a valve chamber 21 and a metering chamber 22. The chambers 21 and 22 are axially aligned and connected by a passageway or control orifice 24. Adjacent the end of the body remote from the control orifice, the valve chamber is formed with an inlet port 25 which communicates with the supply line fitting 15 and the pressurized liquid supply. Between the inlet port 25 and the control orifice 24, the valve chamber is formed with an outlet port 26 communicating with nozzle 19 and its fitting 20.

In accordance with the invention, a resiliently biased valve spool includes at least first and second means for blocking the flow of liquid mounted for relative axial sliding movement within the valve chamber so as to be shifted through a sequence of positions in order to regulate the flow of liquid from the inlet port into the metering chamber, and from the metering chamber to the outlet port. The valve spool has a first operative position establishing communication between the inlet port and the metering chamber while blocking the outlet port. The valve spool has a second operative position isolating a desired quantity of liquid in the metering chamber from both the pressurized liquid supply and nozzle by simultaneously blocking the input and output ports so as to prevent the flow of liquid into or out of the metering chamber. The valve spool has a third operative position establishing communication between the metering chamber and the outlet port 26 while blocking the inlet port.

Referring in greater detail to a valve spool of the first embodiment exemplified by FIGS. 1-4, it is comprised of first and second sections 28, 50, respectively. The former is formed intermediate its ends with a pair of axially spaced lands 29, 30 each of somewhat larger diameter than the remainder of the spool. Each land in this case has an annular groove which houses a respective one of O-rings 31, 32 formed of resilient sealing material. The land 29 and its O-ring 31 serve as a movable seal isolating the inlet port 25 from the outlet port 26. The land 30 and its O-ring serve as a movable seal preventing leakage of pressurized liquid from the inlet port 25 to the end of the valve chamber remote from the control orifice 24. The end of the valve spool section 28 facing the metering chamber 22 is formed with a taper 34 adapted to sealingly engage a mating seat 35 on the control orifice 24. At its opposite end, the valve spool section 28 has an axial stem 36 of reduced diameter which is surrounded by a resilient biasing means in the form of a spiral spring 38. The spring 38 bears against a cap 39 threaded on one end of the body 11 and an annular shoulder on the valve spool surrounding the stem 36. By reason of this construction, the valve spool section 28 is biased into engagement with the control orifice 24.

Provision is made for injecting liquid from the pressurized source into the metering chamber 22 via the valve spool section 28. The spool section 28 is thus formed with an axial passage 40 open at the downstream end which faces the metering chamber and connected at its upstream end with a radial passage 41 which communicates directly with the inlet port 25. When the trigger 16 is in its non-actuated position, the downstream end of the axial passage 40 is open and pressurized liquid flows from the supply line 12 through fitting 15, inlet port 25, passages 41, 40 and into the metering chamber 22 (FIG. 2).

For the purpose of metering the liquid injected into the metering chamber 22 by the valve spool section 28, a metering piston 42 is slidably housed within the chamber 22. The piston 42 is of cup-shaped form, defining an annular recess 44 in the face remote from the control orifice 24. The recess 44 houses a resilient biasing means in the form of a spiral spring 45. The latter is interposed between the bottom end of the recess 44 and a cap 46 fixed to the end of the body 11 adjacent to the trigger 16. The outer periphery of the piston 42 has a groove accommodating an O-ring 48 which defines a sliding seal with the wall of the metering chamber 22. The characteristic of the spring 45 of the metering piston is such that it is adapted to yield against the force of an incoming charge of liquid from the passage 40 of the valve spool section 28. When the incoming liquid charge is cut off and the metering chamber is connected to the outlet, the spring 45 is adapted to drive the metering piston 42 toward the control orifice and against the opposed end wall of the metering chamber to expel the metered quantity of liquid via the outlet port 26.

The volume of liquid delivered by the gun 10 may be selectively varied by means of an adjustment stop 49 adapted to alter the stroke of the metering piston within close tolerances. In the present instance, the stop 49 comprises a screw mounted in a tapped hole in the end wall of the cap 46 and an associated lock nut. The stop 49 is positioned so as to engage the annular end face of the piston surrounding the biasing spring 45 and thereby regulate the piston stroke.

As indicated earlier herein, the valve spool includes a second section 50. It is constrained for axial sliding movement within the body 11 and operatively connected to an intermediate portion of the trigger 16 spaced radially from its pivot 51 on bracket 18. The main body of the valve spool section 50 has a length equal to or slightly shorter than the length of the metering chamber. An area of reduced diameter, defining a shoulder 52 with the main body, is slidably mounted relative to an aperture in the end wall of cap 46. The reduced diameter area connects the valve spool section 50 to the trigger 16 by means of an appropriate coupling 54 engageable by a pin 55 on the trigger.

In order to accommodate the straight line or axial motion of the valve spool section 50 to the arcuate motion of the trigger 16 about its pivot 51, the coupling 54 is fashioned in a general U-shape, defining two spaced apart slide surfaces 56, 58. Accordingly, when the trigger is actuated the radial thrust of the trigger pin 55 will be accompanied by relative linear movement of the pin along one or the other of slide surfaces 56, 58, depending upon the direction in which the trigger is moved about its own pivot 51.

To receive the main body of the valve spool section 50, the metering piston 42 has a central bore 59 with a sliding seal in the form of an O-ring 60. The projecting inner end of the valve spool section 50 has a chamber 61 adapted to enter into sealing engagement with a seat 62 at the mouth of the axial bore 40 of the valve spool section 28.

Figure 3:
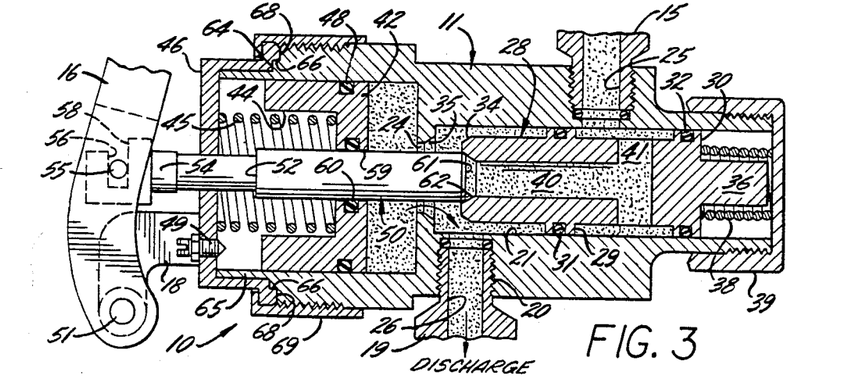
FIG. 3 is an enlarged fragmentary sectional view similar to FIG. 2 but with the dispensing gun in process of discharging liquid from the metering cylinder.

To maintain the orientation of the trigger 16 parallel to the handle 14, appropriate registration means are provided between the spring cap 46 and the body 11 (FIGS. 2-4). In this instance, the body is formed with a shoulder 64 between the skirt 65 defining the outer end portion of the metering chamber and the outer end of the threads surrounding the metering chamber. At least one pair of diametrically opposed flats 66 is formed in the shoulder 64. The spring cover or cap 46 is fashioned with a corresponding pair of diametrically opposed, axially extending, segmental lugs 68. When the cap 46 is telescoped over the metering chamber skirt 65, the lugs 68 on the cap register with the flats 66 in the shoulder 64, thereby orienting the cap 46 and thus the trigger 16 with respect to the body and the handle 14. Tightening of the clamp ring 69 thereby retains the trigger 16 in properly oriented position.

The operation of the gun 10 will become more apparent in light of the foregoing description. Starting with the trigger 16 in the rest position shown in FIGS. 1 and 2, the valve spool section 28 is in a first position wherein its tapered end 34 is seated in the control orifice 24, and the valve spool section 50 is in its retracted position. In this first position of the valve spool, shown in FIG. 2, pressurized liquid from the supply line 12 enters the inlet port 25 and passages 41, 40 of the valve spool section 28, filling the void space in the metering chamber 22 between the face of the metering piston 42 and the end wall of the metering chamber surrounding the control orifice 24. At this time, the outlet port 26 is completely blocked by the valve spool 28.

Upon squeezing the trigger 16 against the handle 14, the valve spool section 50 moves axially from the position shown in FIG. 2 to that shown in FIG. 3. As an incident to such movement, the projecting end of the valve spool section 50 engages the seat 62 at the end of the passage 40, thereby blocking entry of additional liquid to the metering chamber 22 through the inlet port 25. After the projecting end of valve spool section 50 engages the seat of the passage 40, but before further movement of the section 50 causes the section 28 to move away from its sealing engagement with the seat 35 of the control orifice 24, the metering chamber 22 is momentarily isolated from communication with either the input or output ports 25, 26. By providing for the simultaneous blocking of the input and output ports 25, 26, the valve spool sections 28 and 50 cooperate to provide a transitional position from the first position to a third position that ensures the quantity of liquid discharged through the nozzle when the valve spool 28, 50 is in the third position is precisely related to the volume of the metering chamber.

As further movement of the valve spool section 50 forces the valve spool section 28 to the right, its biasing spring 38 is compressed and communication is established with the outlet port 26 via the control orifice 24. This third position of the valve spool 28 opens the outlet port 26 and thereby relieves the back pressure on the liquid within the metering chamber, and the metering piston 42 responds by moving toward the control orifice under the force of its biasing spring 45. Such motion continues, passing from the condition illustrated in FIG. 3 to that shown in FIG. 4 where the metering piston 42 has emptied the metering chamber of its precise quantity of liquid and has brought its face into abutment with the inner end wall of the metering chamber.

Upon release of the trigger 16 following discharge of the metered quantity of liquid, the valve spool sections 28 and 50 will be driven in unison to the left by the biasing spring 38 until the tapered end 34 of the valve spool section 28 engages the mating seat of the control orifice 24, as shown in FIG. 2. Since this cuts off communication with the outlet port, liquid pressure from the supply line bears against the projecting end of the valve spool section 50, forcing it to the left until the shoulder 52 at the end of the enlarged portion engages the inner face of the cap 46, also as shown in FIG. 2. This establishes communication of pressurized liquid between the passage 40 and the metering chamber via the control orifice, forcing the metering piston to the left against its biasing spring and refilling the metering chamber. At that point, the gun is ready for another cycle.

Since the foregoing embodiment of the present invention is utilized in the food industry, sanitation is an important consideration. The construction of the gun 10 lends itself well to quick disassembly for cleaning. The end caps 39, and 46, being threadedly attached to the body 11, may readily be removed. This permits easy removal of the valve spool section 28 and its biasing spring. Upon removal of the end cap 46 and disconnection of the pivotal fitting on the valve spool section 50 from the trigger, the metering piston 42, its biasing spring 45, and the spool valve section 50 may readily be removed from the metering chamber. The O-ring type liquid seals on the valve spool and metering piston lend themselves to easy removal for cleaning. Following the cleaning operation, the parts of the gun may be quickly and easily reassembled to restore the gun to service.

Figure 5:
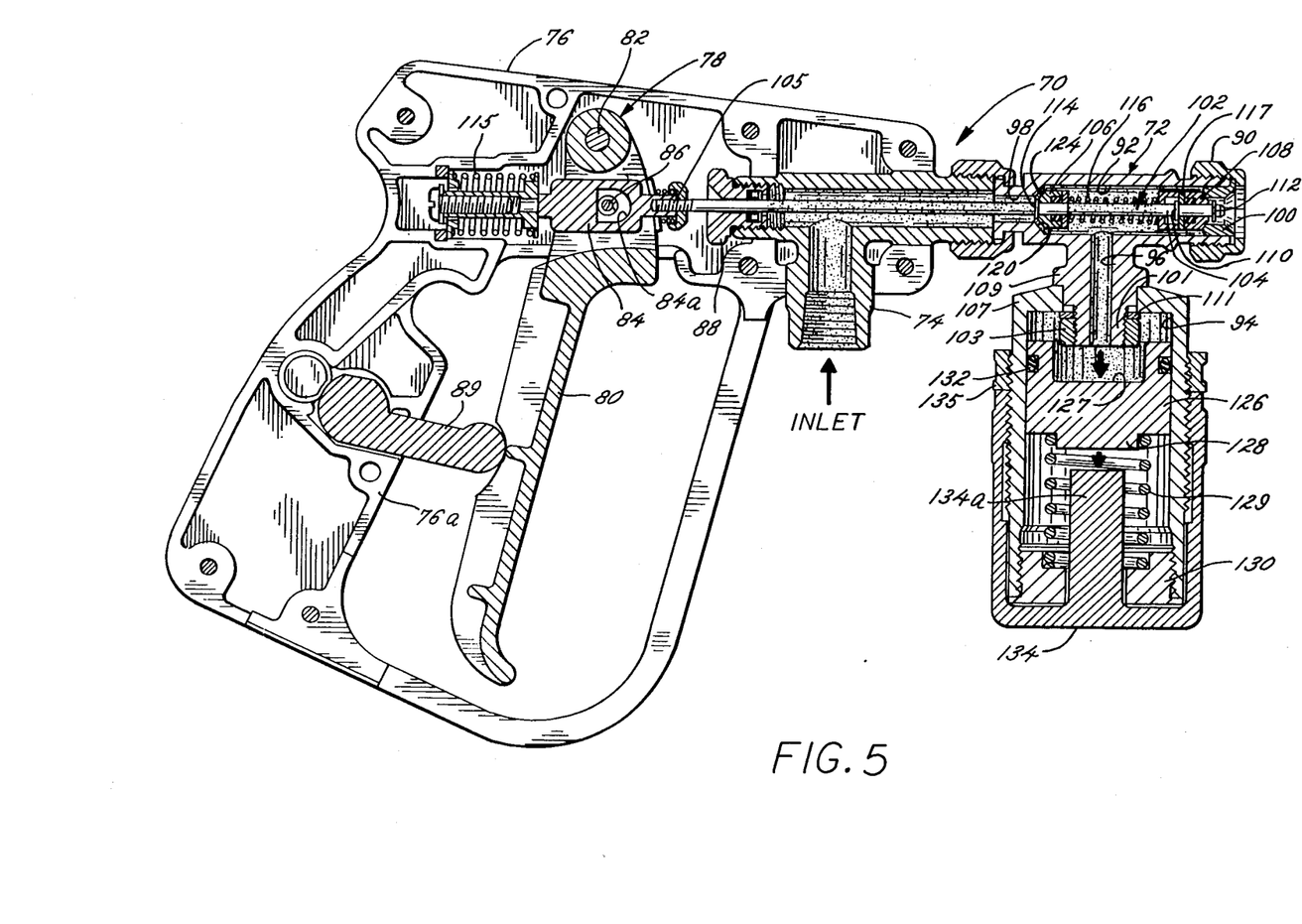
FIG. 5 is a sectional side view of an illustrative liquid dispensing gun exemplifying an alternative embodiment of the present invention, with the parts in their liquid intake positions.
Figure 6:
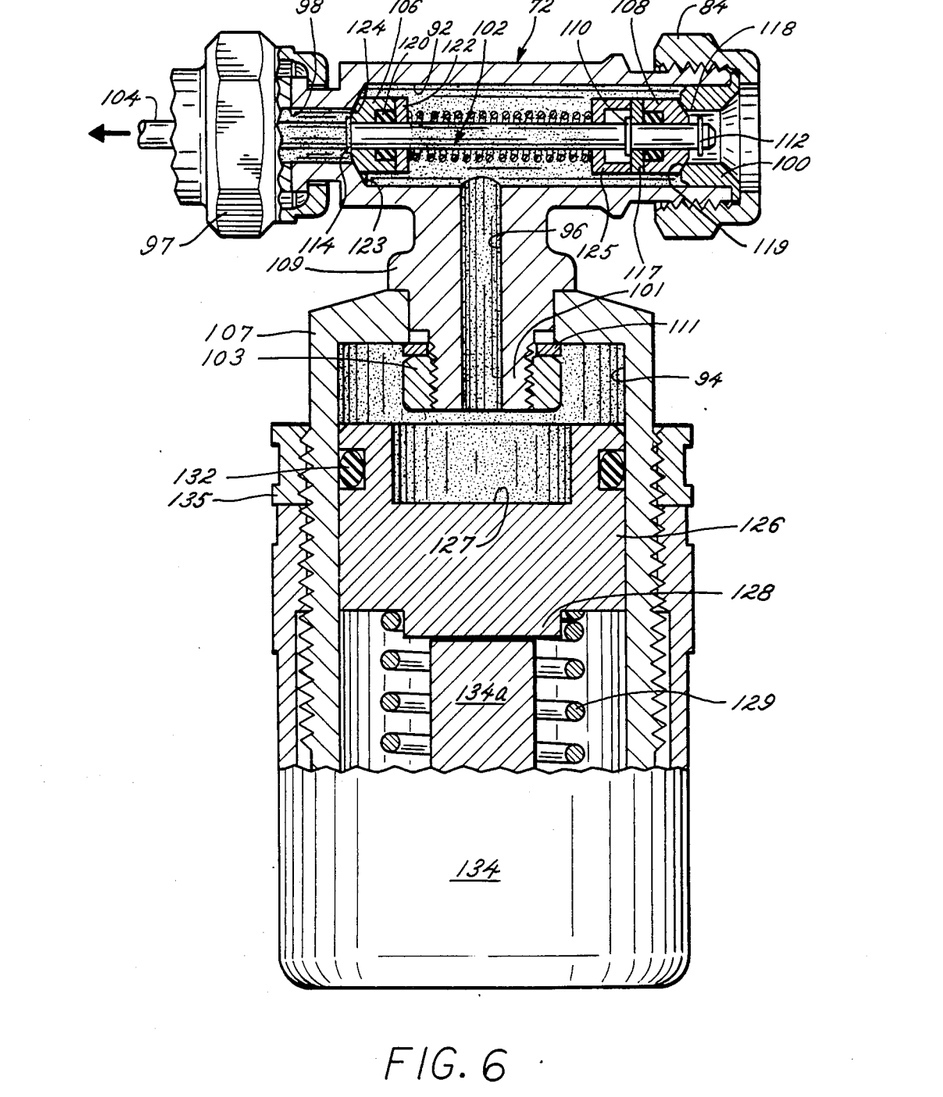
FIG. 6 is an enlarged fragmentary sectional view of the body of the dispensing gun shown in FIG. 5 with the parts in their liquid isolating positions.
Figure 7:
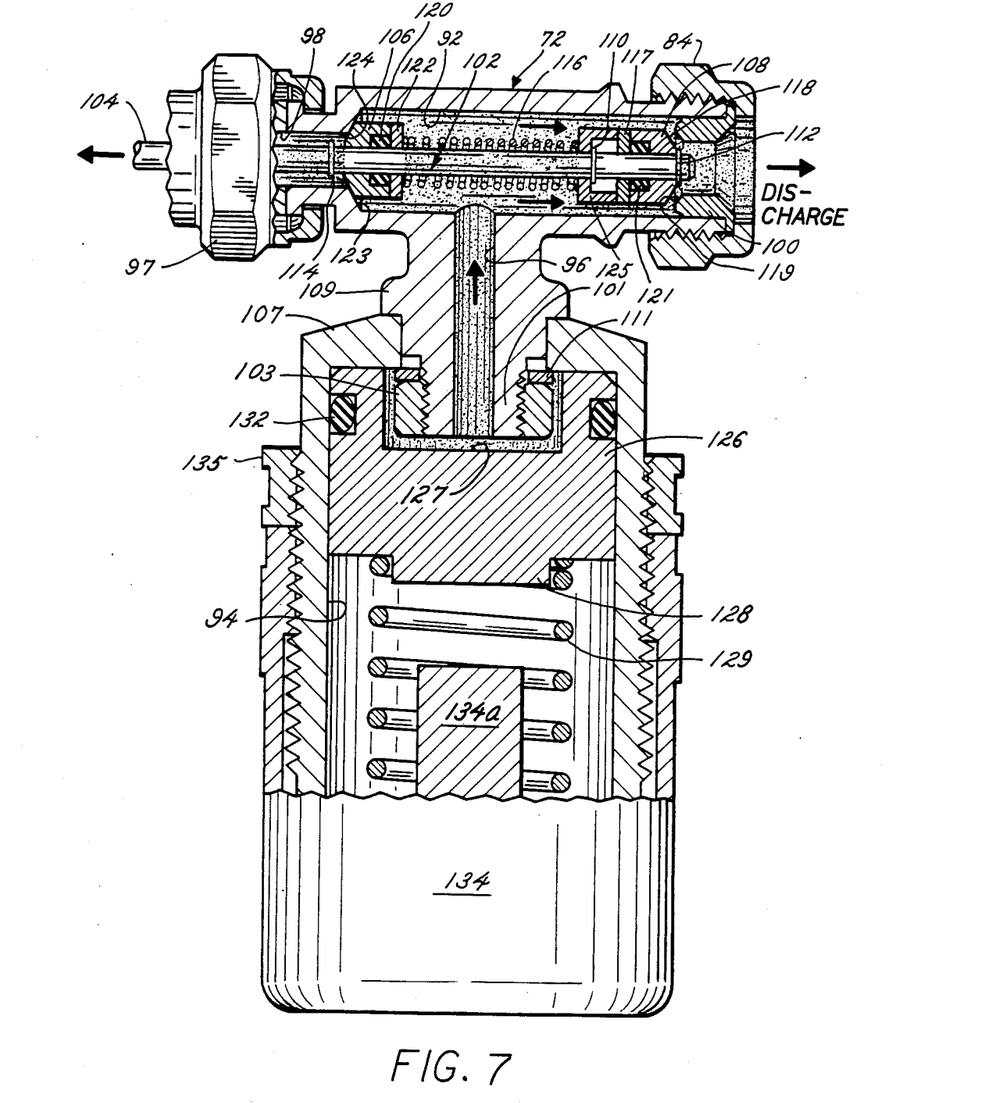
FIG. 7 is an enlarged fragmentary sectional view similar to FIG. 6, but with the parts in their liquid discharging positions.

Turning to the alternative and preferred embodiment of the present invention illustrated in FIGS. 5-7, a dispensing gun 70 comprises a hollow body 72 connected to a pressurized liquid source (not shown) via a pressurized supply line 74 comprising a tee joint housed in a handle 76, which also houses a trigger assembly 78. The trigger assembly 78 includes an actuating arm 80 pivotally mounted to the handle 76 by a pivot pin 82. The arcuate motion of the trigger arm 80 is translated to a linkage 84 mounted for reciprocating linear motion by a rod 86 attached to the trigger arm at a radius and passing through a transverse bore 84a in the linkage. In the foregoing arrangement, squeezing of the trigger arm 80, imparting unidirectional force to the trigger arm, causes the rod 86 to engage a flat of the bore 84a and move the linkage 84 to the left. The linkage 84 is held in a linear registration by a guide fitting 88 received by one end of the tee joint formed by the supply line 74. In order to accommodate both the linear motion o the linkage 84 and the arcuate motion of the rod 86, the flat of the bore 84a extends laterally beyond the diameter of the rod so that the rod is loosely received by the bore.

Fluid is discharged from the gun 70 by way of an outlet nozzle (not shown) threadedly attached by cap 90 to the hollow body 72. Each time the trigger 80 is squeezed toward the gripping portion 76a of the handle 76, a precisely metered quantity of liquid is discharged from the gun 70. Upon release of the trigger 80, the gun 70 promptly reloads for the next discharge. In order to prevent accidental discharge of liquid, a pivotable safety lock 89 interferes with the arcuate motion of the trigger arm 80 when the lock is in its illustrated position.

In order to provide for the intake and discharge of liquid to and from the dispensing gun 70, the hollow body 72 is formed with a valve chamber 92 and coupled to a metering chamber 94. The chambers 92 and 94 are orthogonally aligned relative to their axial dimensions and are connected by a passageway 96 in the hollow body 72 which forms a tee joint configuration with the valve chamber 92. Adjacent the end of the hollow body 72 which is attached to the handle 76 by a retaining cap 97, the valve chamber 92 is formed with an inlet port 98 for communicating with the supply line 74 and the pressurized liquid supply. Adjacent the cap 90 of the outlet nozzle, the valve chamber is formed with an outlet port 100 for communicating with the nozzle.

To maintain the coupling between the hollow body 72 and the metering chamber 94, a fitting 101 for the passageway 96 is received by an opening in the top of the chamber, and a locking ring 103 is threaded over the fitting. Tightening of the locking ring 103 against a shoulder area 107 surrounding the top opening of the metering chamber 94 biases the outer surface of the shoulder into a complementarily-shaped annular flange 109 of the hollow body 72. A washer 111 is provided between the locking ring 103 and the shoulder 107 in order to prevent leakage of the pressurized liquid from the metering chamber 94.

In keeping with the invention, a resiliently biased valve spool 102 includes first and second blocking means mounted for relative axial sliding movement within the valve chamber to regulate the flow of liquid from the inlet port into the metering chamber, and from the metering chamber to the outlet port by shifting the portions of the valve spool through a sequence of positions which first allows communication between the input port 98 and the metering chamber 94 then isolates the metering chamber from both input and output ports and finally establishes communication between the metering chamber and the output port while blocking the input port. In order to provide for the alternating blocking and unblocking of the input and output ports, the first and second blocking means of the valve spool 102 comprise a pair of valve poppets which move relative to one another in response to a lost-motion means incorporated into the valve spool.

Referring in greater detail to the valve spool 102, it will be noted that it is formed by an elongated stem 104 extending from the valve chamber through the inlet port 98 to a coupling 105 joining the stem to the linkage 84 of the trigger assembly 78. The valve spool 102 also includes opposing poppet valves or end members 106, 108 slidably mounted to the stem 104. As part of the lost-motion means of the valve spool, retaining rings 110 and 112 are secured to the stem 104 for retaining end member 108 on the stem and limiting the extent of its slidable movement. For the purpose of restraining the slidable movement of the end member 106 on the stem 104 and also as part of the lost-motion means, a third retaining ring 114 is secured to the stem upstream from the end member 106. In order for the valve spool to realize lost motion, a spiral spring 116 is coaxially mounted to the stem 104 and biased at each of its ends against one of the slidable end members 106, 108. Such biasing urges the end members 106, 108 in opposite directions so that end member 106 is urged toward the outlet port 98 and end member 108 is urged toward the inlet port 100. Because of the biasing from spring 116, the end members 106, 108 will tend to slide over the stem 104 as it axially moves. But, engagement of one of the retaining ring prevents further sliding and serves to thereafter carry the member on the stem 104.

Provision is made for injecting liquid from the pressurized source into the metering chamber 94 via the valve chamber 102 and the passageway 96 when the trigger assembly 78 is in its relaxed position shown in FIG. 5. Thus, the trigger assembly 78 includes a biasing means in the form of the spiral spring 115 that places an axial force on the stem 104 via the linkage 84 so as to shift the stem to its most rightward position as shown in FIG. 5. In this most rightward position, the retaining ring 114 is downstream of a seat 123 formed by a transition between valve chamber 102 and the inlet port 98 so as to engage the end member 106. This downstream position of the retaining ring 114 moves the member 106 away from the seat 123 against the force of the biasing spring 116. With the inlet port 98 unblocked, the pressurized liquid flows from the supply line 74, through the inlet port and valve chamber 92 and into the metering chamber 94.

To oppose the axial force of the spring 115 and limit the extent of the rightward shifting of the stem 104, the retaining ring 110 engages a back-up ring 117 of the end member 108. Since the end member 100 is biased into the outlet port 108 by spring 116, the back-up ring 117 of the member serves to prevent further rightward shifting of the stem 104 in response to the force created by spring 115. For the end member 108 to block the outlet port 100 and thereby prevent flow of liquid through the port, the end member includes a chamber 118, as best seen in FIG. 7, which mates with a seat 119 formed by a tapered transitional area joining the valve chamber 92 and the outlet port 100. In order to ease the slidable movement of the end members 106, 108 on stem 104, O-rings 120, 121, respectively, are received by annular recesses in the members. To retain these O-rings in place, the back-up ring 117 is integral with end member 108. The end member 106 is provided with a similar back-up ring 122.

In the fully-actuated position of the trigger arm 80, shifting of the stem 104 causes retaining rings 112 and 114 to move upstream relative to seats 119 and 123, respectively, as shown in FIG. 7. As the retaining ring 112 moves upstream of seat 119, it engages the end member 108 so as to prevent further sliding of the member along the stem 104. Continued axial movement of the stem 104 moves the end member 108 against the biasing force of the spring 116 so as to disengage the chamber 118 of the end member and the mating seat 119. In contrast to the effect the upstream movement of the retaining rings 110, 112 has on end member 108, the biasing force of the spring 116 causes the upstream movement of the retaining ring 114 to draw a chamber 124 of end member 106 into positive engagement with the seat 123. Further axial movement of the stem 104 causes the end member 106 to slide on the stem since it is unrestrained on its downstream side, thereby compressing spring 116.

Intermediate the relaxed and fully-actuated positions of the trigger assembly 78, the valve spool is positioned to isolate the liquid in the metering chamber by simultaneously blocking the inlet and outlet ports. Referring to FIG. 6, the retaining rings 110, 112 and 114 and end members 106, 108 are appropriately arranged so that shifting the stem 104 to the left in FIG. 6 will cause the chamber 124 of end member 106 to engage the seat 123 before the chamber 118 of end member 108 is disengaged from the seat 119. To provide for this simultaneous blocking of the input and output ports, the outermost rings 112 and 114 are separated by a distance greater than the axial length of the valve chamber 92. Furthermore, a spacer ring 125 for the retaining ring 110 has a depth, as measured along the axis of the valve chamber 92, that is sufficient to prevent the engagement of the spacer ring and retaining ring 110 prior to the chamber of the end member 106 mating with seat 123.

For the purpose of metering the liquid injected into the metering chamber 94 by the valve spool 102, a metering piston 126 is slidably housed within the chamber 94. The piston 126 is of cup-shaped form, defining an annular recess 127 in the face adjacent the passageway 96 for receiving the passageway fitting 101 and the locking ring 103. At its opposite end, the piston 126 has a short axial stem 128 of reduced diameter which is surrounded by a resilient biasing means in the form of a spiral spring 129. The spring 129 is interposed between the bottom of the cylinder 126 and a cap 130 (shown in FIG. 5) fixed to the end of the metering chamber 94. The outer periphery of the piston 126 has a groove accommodating an O-ring 132 which defines a sliding seal with the wall of the metering chamber. The characteristic of the spring 129 of the metering piston is such that it is adapted to yield against the force of an incoming flow of pressurized liquid from the passageway 96.

When the incoming flow of liquid is stopped and the metering chamber 94 is connected to the outlet port 100, the spring 129 is adapted to drive the metering piston 126 toward the passageway 96 and against the opposed end wall of the metering chamber to expel a metered quantity of liquid via the outlet port 100.

In both embodiments of the invention, the volume of liquid metered and delivered by the gun may be selectively varied by means of an adjustable stop adapted to alter the stroke of the metering piston within close tolerances. In the present instance, the stop comprises an axial stem 134a of a cylindrical cover 134 threaded over the outer wall of the metering chamber 94. A central opening in the cap 130 receives the stem 134a of the cylindrical cover 134 so that the stem may extend into the metering chamber 94. The extent that the stem 134a intrudes into the metering chamber 94 can be precisely fixed by adjusting the position of the cylindrical cover 134 on the chamber. A lock nut 135 associated with the cylindrical cover 134 maintains the stop in a selected position. In operation, the axial stem of the cylindrical cover 134 is positioned so as to engage the axial stem 128 of the metering piston 126 and thereby regulate the piston stroke.

The operation of the gun 70 will become more apparent in light of the following description. Starting with the trigger arm 80 in the rest position shown in FIG. 5, the chamber 118 of the end member 108 is biased by the spring 116 into the seat 119 and the end member 106 is held away from the seat 123 by retaining ring 114. In this first position of the valve spool 102, pressurized liquid from the supply line 74 enters the inlet port 98, passes through the valve chamber 102 and fills the void space in the metering chamber 94 between the face of the metering piston 126 and the end wall of the metering chamber surrounding the passageway 96. At this time, the outlet port 100 is completely blocked by the end member 108 of the valve spool 102.

Upon squeezing the trigger arm 80 against the gripping portion 76a of the handle 76, the stem 104 moves axially leftward as indicated by the arrows in FIGS. 6 and 7 so as to change the position of the valve spool from its first position shown in FIG. 5 to a second position shown in FIG. 6. As an incident to such movement, retaining ring 114 moves upstream of the seat 123, causing the end member 106 to positively engage the seat and thereby preclude entry of additional liquid through the inlet port 98. Because retaining ring 112 is still downstream of the end member 108, the chamfer of the latter is still positively engaged with the seat 119, precluding outflow of pressurized liquid from the metering chamber 94.

Further squeezing of the trigger arm 80 moves the arm to its fully actuated position shown in FIG. 7 wherein the valve spool 102 has moved to a third position such that the stem 104 is in its most leftward position. As a result of the movement of the stem 104 from its position in FIG. 6 to its position in FIG. 7, the end member 106 slides along the stem and maintains its stationary position relative to the valve chamber 102. In the most leftward position of the stem 104, the retaining ring 112 is now drawn upstream of the seat 119 so that it engages end member 108, thereby preventing the latter from sliding over the moving stem 104 and maintaining biased engagement with the seat 119. Engagement of the retaining ring 112 with the end member 108 causes the member to move with the stem 104 by compressing spring 116 and thereby establishing communication between the metering chamber 94 and the outlet port 100 via the passageway 96 and valve chamber 92. This relieves the back pressure on the liquid within the metering chamber 94 and the metering piston 126 thus moves toward the passageway 96 under the force of its biasing spring 129. Such motion continues to the condition of the metering piston 126 illustrated in FIG. 7 where the piston has emptied the metering chamber 94 of its precise quantity of liquid and has brought its face into abutment with the inner end wall of the metering chamber.

Upon release of the trigger arm 80 following discharge of the metered quantity of liquid, the stem 104 will be driven to the right by the biasing spring 115 until the end member 108 engages the seat 119 and the retaining ring 110 engages the back-up ring 117 of the member 108. Since the movement of the stem 104 in a right-hand direction brings the retaining ring 114 to a position downstream of the seat 123, the end member 106 is drawn off its seated position so as to open the inlet port 98 and establish communication of pressurized liquid between the valve chamber 102 and the metering chamber 94 via the passageway 96. In-flow of the pressurized liquid forces the metering piston 26 downward against its biasing spring 129 and refills the metering chamber 94. At that point, the gun is ready for another cycle.

We claim:

1. A gun for repeatedly dispensing precisely metered quantities of liquid from a pressurized source, comprising, in combination:
   (a) a hollow body having has a substantially horizontal portion;
   (b) said horizontal body portion having a valve chamber with inlet and outlet ports at opposite ends thereof;
   (c) means defining a metering chamber disposed in depending relation to said horizontal body portion so that said horizontal body portion and metering chamber defining means form a substantially T-configuration;
   (d) said body having a passage communicating between said valve and metering chamber;
   (e) a handle coupled to said horizontal body portion and extending in depending relation thereto;
   (f) an actuating trigger pivotably mounted adjacent said handle for movement between first and second positions,
   (g) said body having a pressurized liquid inlet passage located between s aid handle and valve chamber inlet port and communicating with said inlet port;
   (h) an axially slidable valve spool in said valve chamber;
   (i) first and second blocking means disposed on said spool for regulating the flow of liquid through said valve chamber inlet and outlet ports;
   (j) lost-motion means for permitting relative motion of said first and second blocking means in response to movement of said valve spool;
   (k) resilient biasing means for normally urging said valve spool in a direction that causes said first blocking means to engage said outlet ports while said second blocking means is maintained in disengaged relation to said inlet port for permitting the flow of pressurized liquid into said metering chamber; and
   (l) means responsive to pivotable movement of said axially moving said spool so as to cause said second blocking means to close said inlet port while said outlet port is closed by said first blocking means thereby isolating a metered quantity of liquid in said metering chamber, and then to move said first blocking means away from said outlet port so as to permit the discharge of said meter quantity of liquid from said metering chamber through said outlet port.

2. The combination set forth in claim 1 including second resilient biasing means interposed between said first and second blocking means.

3. The combination set forth in claim 1 in which said body has a T-shaped configuration with a lower portion depending from said horizontal portion.

4. The combination set forth in claim 1 including cup means mounted on said lower body portion for defining said metering chamber.

5. The combination set forth in claim 4 in which said cup means is adjustable for permitting selective adjustment in the amount of metered liquid to be dispensed.

* * * * *